United States Patent
Kurabayashi

(10) Patent No.: US 11,331,580 B2
(45) Date of Patent: May 17, 2022

(54) SYSTEM, METHOD, PROGRAM, MACHINE-LEARNING ASSISTING DEVICE, AND DATA STRUCTURE FOR INSPECTING GAME PROGRAM

(71) Applicant: CYGAMES, INC., Tokyo (JP)

(72) Inventor: Shuichi Kurabayashi, Tokyo (JP)

(73) Assignee: CYGAMES, INC., Tokyo (JP)

( * ) Notice: Subject to any disclaimer, the term of this patent is extended or adjusted under 35 U.S.C. 154(b) by 0 days.

(21) Appl. No.: 17/024,172

(22) Filed: Sep. 17, 2020

(65) Prior Publication Data

US 2021/0001231 A1 Jan. 7, 2021

Related U.S. Application Data

(63) Continuation of application No. PCT/JP2019/010927, filed on Mar. 15, 2019.

(30) Foreign Application Priority Data

Mar. 20, 2018 (JP) .............................. JP2018-052703

(51) Int. Cl.
 *A63F 13/67* (2014.01)
 *A63F 13/537* (2014.01)
(52) U.S. Cl.
 CPC ............ *A63F 13/67* (2014.09); *A63F 13/537* (2014.09)
(58) Field of Classification Search
 CPC ................................. A63F 13/537; A63F 13/67
 See application file for complete search history.

(56) References Cited

U.S. PATENT DOCUMENTS

| 6,312,337 B1 * | 11/2001 | Edwards | A63F 13/12 463/42 |
| 6,332,838 B1 * | 12/2001 | Yamagami | A63F 13/005 463/9 |
| 2020/0206622 A1 * | 7/2020 | Noguchi | A63F 13/537 |

OTHER PUBLICATIONS

P. Garcia-Sanchez et al., "Automated Playtesting in Collectible Card Games using Evolutionary Algorithms", 2018, ResearchGate, pp. 1-34, at https://www.researchgate.net/publication/324767888_Automated_Playtesting_in_Collectible_Card_Games_using_Evolutionary_Algorithms_a_Case_Study_in_HearthStone (Year: 2018).*
International Search Report issued in Application No. PCT/JP2019/010927, dated Apr. 9, 2019 (5 pages).

(Continued)

*Primary Examiner* — Steve Rowland
(74) *Attorney, Agent, or Firm* — Osha Bergman Watanabe & Burton LLP

(57) ABSTRACT

One or more embodiments of the invention provides a system for inspecting a game program for a game that progresses as a user selects a medium from an owned medium set including a plurality of media and places the medium on a game field. A game log including medium information regarding the media, included in a game state including the game field and the owned medium set, is obtained, tensor data is created by creating array data in which matrices representing the media information included in the game state are arrayed along a time axis based on the obtained game log, machine learning is performed by using the created tensor data, thereby generating a learning model, the medium to be selected by the user is inferred by using the learning model, and the game program is executed using the inferred medium as a choice of the medium by the user.

15 Claims, 8 Drawing Sheets

(56) References Cited

OTHER PUBLICATIONS

Written Opinion issued in International Application No. PCT/JP2019/010927, dated Apr. 9, 2019 (3 pages).
"Develop Secure, High-Quality Software;" Synopsys, Inc.; Retrieved from the Internet: URL: https://www.synopsys.com/software-integrity.html (7 pages).

* cited by examiner

INPUT VALUES

OUTPUT VALUE

FIG.8

OPERATION LOG X1 OF USER X

OPERATION LOG Y1 OF USER Y

OPERATION LOG X2 OF USER X

OPERATION LOG Y2 OF USER Y

⋮

OPERATION LOG Yn OF USER Y

FIG.9

|  | $A_1$ | $A_2$ | ⋯ | $A_n$ |
|---|---|---|---|---|
| STAGE | 1 | 0 | ⋯ | 1 |
| DECK | 0 | 1 | ⋯ | 1 |

FIG.10

|  | $A_1$ | $A_2$ | ⋯ | $A_n$ |
|---|---|---|---|---|
| STAGE | 1 | 1 | ⋯ | 1 |
| DECK | 0 | 0 | ⋯ | 1 |

| | | EXISTING CARD PACK A | | | | |
| --- | --- | --- | --- | --- | --- | --- |
| | | $A_1$ | $A_2$ | $A_3$ | ... | $A_n$ |
| NEW CARD PACK B | $B_1$ | 0.9 | 0 | 0 | ... | 0.1 |
| | $B_2$ | 0 | 0 | 0.4 | ... | 0.2 |
| | $B_3$ | 0.1 | 0.4 | 0.25 | ... | 0 |
| | ... | ... | ... | ... | ... | ... |
| | $B_m$ | 0.43 | 0.33 | 0.11 | ... | 0.04 |

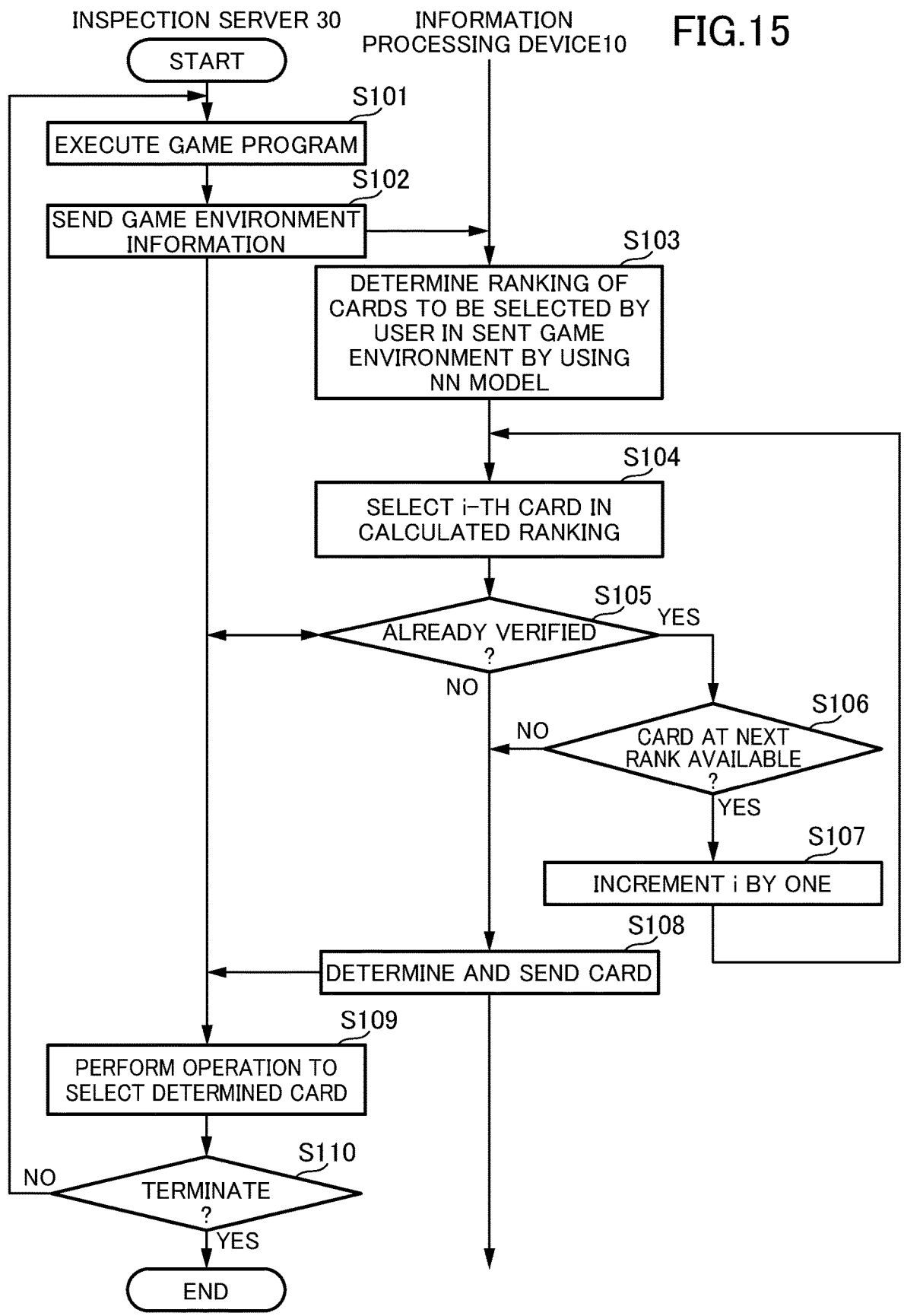

SYSTEM, METHOD, PROGRAM, MACHINE-LEARNING ASSISTING DEVICE, AND DATA STRUCTURE FOR INSPECTING GAME PROGRAM

TECHNICAL FIELD

The present invention relates to systems, methods, programs, machine-learning devices, and data structures for inspecting a game program.

BACKGROUND ART

Recently, the number of players who enjoy online games in which a plurality of players can participate via a network is increasing. For example, such games are realized by a game system in which portable terminal devices such as smartphones communicate with a server device of a game administrator, which makes it possible for a player who operates a portable terminal device to play a battle with other players.

Before providing a game, the game administrator must inspect the game program to detect bugs. Generally, technology for improving the efficiency of such inspection is called quality assurance (QA) technology.

An existing example of QA technology is static code analysis, in which static inspection not involving program execution is automatically executed. With static code analysis, potential problems and disparities from specifications are detected by analyzing the format and content of the source code of a program to be verified. Tools for checking the format of a program, such as lint, have been provided on UNIX (registered trademark) systems since long before, and coverity is a well-known commercial product (Non Patent Literatures 1 and 2). However, since it is difficult to exhaustively verify the behavior at the time of execution from the source code, it has been necessary to employ dynamic analysis in combination therewith.

Dynamic analysis is dynamic inspection involving program execution, which is called test play, and has been executed as a part of the QA process for a long time. Test play is a method in which special engineers called debuggers or testers actually play a game to discover problems, with which considerable effects can be expected. In performing such QA, since the number of combinations of player actions in a game is huge, the game administrator has to detect bugs by running the game program while choosing combinations in descending order of the probability of execution.

CITATION LIST

Non Patent Literature

{NPL 1}
Darwin, Ian F. Checking C Programs with Lint. ISBN 0-937175-30-7.
{NPL 2}
Synopsys, Inc. Coverity, https://www.synopsys.com/software-integrity.html

SUMMARY OF INVENTION

Technical Problem

An example of a game for which QA is performed is the type of card game called a digital collectible card game (DCCG), in which various actions are executed in accordance with combinations of cards, characters, etc. (hereinafter referred to as "card combinations"). Although card combinations drastically enhance strategic possibilities of a game, the number of situations to be verified increases explosively. For example, in a card battle game in which a battle is played by placing cards at hand on a game field (stage), if there are 1,000 cards and a battle consisting of eight turns on average is played, cards are placed on the stage about sixteen times. In this case, the number of combinations defining patterns of the situation on the stage is $1,000^{16}$, which indicates that a substantially infinite number of combinations occur. It has been extremely difficult to perform exhaustive verification for such an infinite number of card combinations through manual test play since a huge number of staff and a huge amount of time are required.

The present invention has been made in order to solve the problem described above, and it is a chief object thereof to provide a system, etc. that make it possible to inspect a game program while inferring actions more likely to be executed by users.

Solution to Problem

In order to achieve the above object, a system according an aspect of the present invention is a system for inspecting a game program for a game that progresses as a user selects a medium from an owned medium set configured to include a plurality of media and places the medium on a game field, the system being characterized by including: a game-log obtaining unit that obtains a game log from a game server that stores the game log, the game log being created in accordance with a user operation and including medium information regarding the media, the medium information being included in a game state configured to include the game field and the owned medium set; a tensor-data creating unit that creates tensor data by creating array data in which matrices representing the media information included in the game state are arrayed along a time axis on the basis of the obtained game log; a learning unit that generates a learning model by performing machine learning while using the created tensor data as learning data; an inference unit that infers the medium to be selected by the user in a given game state by using the learning model; and an inspection unit that inspects the game program by executing the game program while using the medium inferred by the inference unit as a choice of the medium by the user in the game state as the game progresses.

Furthermore, in the present invention, preferably, in the matrices, one of the kinds of media provided in the game and the distinction between the game field and the owned medium set constitutes rows and the other constitutes columns, and the tensor-data creating unit stores information regarding the presence or absence of the medium in each element of the matrices.

Furthermore, in the present invention, preferably, the tensor-data creating unit creates new tensor data by creating the array data on the basis of a game log newly obtained by the game-log obtaining unit.

Furthermore, in the present invention, preferably, the game log includes information for identifying the user, and the tensor-data creating unit creates tensor data by storing the array data on a per-user basis along a user axis representing the kind of user.

Furthermore, in the present invention, preferably, the game is a battle game in which a plurality of users play a battle by selecting media from the individual owned medium sets thereof and placing the media on the game field, and the tensor-data creating unit creates tensor data by storing the array data along a number-of-appendings axis representing the number of times that appending is performed.

Furthermore, in the present invention, preferably, the kinds of media provided in the game vary depending on a class selected by the user, the game log includes information for identifying the class, and the tensor-data creating unit creates tensor data by storing the array data on a per-class basis along a class axis representing the kind of class.

Furthermore, in the present invention, preferably, when a new kind of medium is added to the game, the inference unit infers the medium to be selected by the user in the given game state by further using a transformation matrix representing the relationship between the medium being added and the media provided in the game.

Furthermore, in the present invention, preferably, the learning model is a neural network model.

Furthermore, in the present invention, preferably, the inference unit compares the likelihoods of the media to be selected by the user with a predetermined threshold and outputs the medium having the highest likelihood, and the inspection unit inspects the game program by executing the game program while using the medium output by the inference unit as a choice of the medium by the user.

Furthermore, in the present invention, preferably, the inspection unit inspects the game program by executing the game program while using the media output by the inference unit as choices of the medium by the user in order from the medium having the highest likelihood.

Furthermore, in the present invention, preferably, the inspection unit inspects the game program by executing the game program in a headless mode.

Furthermore, in the present invention, preferably, the owned medium set is constituted of a first medium set that can be selected by the user and a second medium set that cannot be selected by the user, the first and second medium sets being determined in accordance with the progress of the game, and the inference unit infers, from the first medium set, the medium to be selected by the user in the given game state by using the learning model.

Furthermore, in order to achieve the above object, a method according to an aspect of the present invention is a method for inspecting a game program for a game that progresses as a user selects a medium from an owned medium set configured to include a plurality of media and places the medium on a game field, the method being characterized by including: a step of obtaining a game log from a game server that stores the game log, the game log being created in accordance with a user operation and including medium information regarding the media, the medium information being included in a game state configured to include the game field and the owned medium set; a step of creating tensor data by creating array data in which matrices representing the media information included in the game state are arrayed along a time axis on the basis of the obtained game log; a step of generating a learning model by performing machine learning while using the created tensor data as learning data; a step of inferring the medium to be selected by the user in a given game state by using the learning model; and a step of inspecting the game program by executing the game program while using the medium inferred as a choice of the medium by the user in the game state as the game progresses.

Furthermore, in order to achieve the above object, a program according to an aspect of the present invention is characterized by causing a computer to execute the steps of the above method.

Furthermore, in order to achieve the above object, a machine-learning assisting device according to an aspect of the present invention is a machine-learning assisting device that creates learning data for generating a learning model through machine learning, the learning model serving to infer a medium to be selected by a user in a game that progresses as the user selects a medium from an owned medium set configured to include a plurality of media and places the medium on a game field, the machine-learning assisting device being characterized by including: a game-log obtaining unit that obtains a game log from a game server that stores the game log, the game log being created in accordance with a user operation and including medium information regarding the media, the medium information being included in a game state configured to include the game field and the owned medium set; and a tensor-data creating unit that creates tensor data by creating array data in which matrices representing the media information included in the game state are arrayed along a time axis on the basis of the obtained game log.

Furthermore, in order to achieve the above object, a data structure according to an aspect of the present invention is a data structure of learning data for generating a learning model through machine learning, the learning model serving to infer a medium to be selected by a user in a game that progresses as the user selects a medium from an owned medium set configured to include a plurality of media and places the medium on a game field, the data structure being characterized by including tensor data, created on the basis of a game log created in accordance with a user operation and including medium information regarding the media, the medium information being included in a game state configured to include the game field and the owned medium set, by creating array data in which matrices representing the media information included in the game state are arrayed along a time axis, and the data structure being characterized in that a computer is caused to generate a learning model by performing machine learning while using the tensor data as learning data and to output inference information about the media having higher likelihoods in a given game state by using the learning model.

Advantageous Effects of Invention

The present invention makes it possible to inspect a game program while inferring actions that are more likely to be executed by a user

BRIEF DESCRIPTION OF DRAWINGS

FIG. 8 shows an example of game logs stored in a log database.

FIG. 9 shows an example of a card information matrix at a certain point in time.

FIG. 10 shows an example of a card information matrix at a certain point in time.

FIG. 15 shows an example flowchart of an inspection process by the inspection server and the information processing device.

DESCRIPTION OF EMBODIMENTS

Now, an inspection system for inspecting a game program, according to an embodiment of the present invention, will be described with reference to the drawings.

A technical feature of an inspection system 1 according to the embodiment of the present invention is that game logs that are accumulated in accordance with the status of the progress of a game are additionally mapped to a tensor structure having a format that allows learning by using a deep neural network (DNN) technology. With this configuration, by using game logs reflecting user actions, a neural network model (NN model) is generated, thereby constructing a mechanism for calculating human-like choices. Thus, AI bots that automatically select actions likely to be adopted by humans in certain specific game states are created, and the AI bots are made to repeat test plays. This makes it possible to continue to preferentially discover bugs having higher probabilities of being encountered by users.

Now, machine learning and neural networks (NNs) will be briefly explained. Machine learning is a method directed to acquire patterns hidden in data of input values and output values from that data. A neural network is a framework used in machine learning and has a function of learning (approximating) a function representing an input and output relationship from input and output values.

Figure 2:
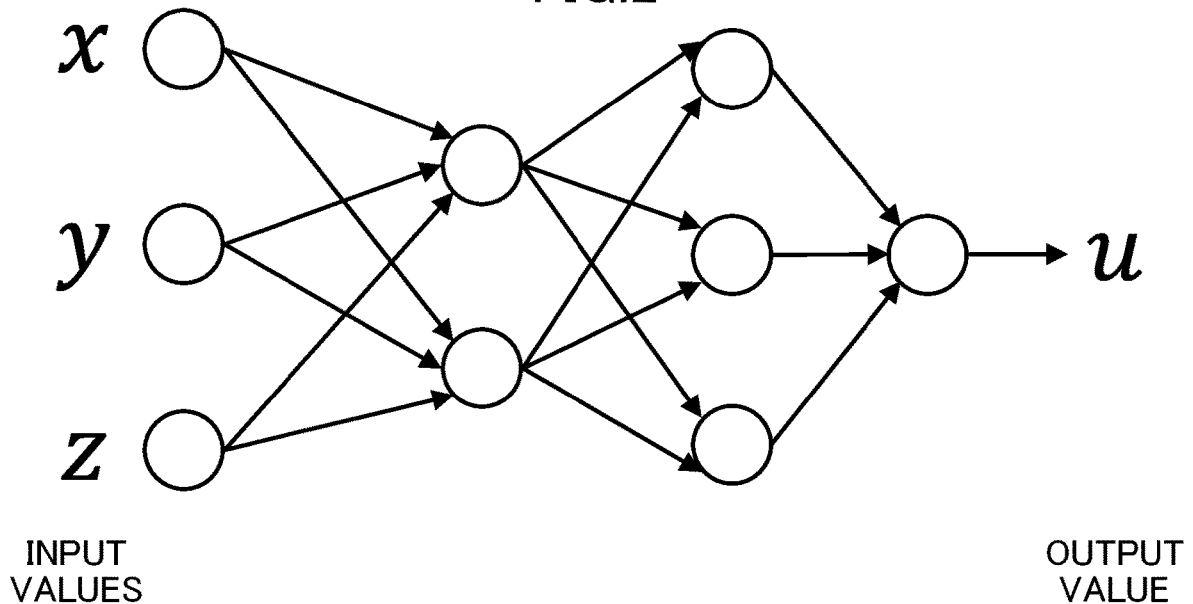
FIG. 2 shows an example neural network model.

FIG. 2 shows an example NN (four-layer DNN). The four-layer DNN shown in FIG. 2 has three nodes corresponding to input values x, y, and z as inputs and one node corresponding to an output value u as an output. The four-layer DNN has two intermediate layers, and each node in the intermediate layers has a weight. With the four-layer DNN, it is possible to generate appropriate weights for the individual nodes by utilizing a large amount of input/output data. This is generally called deep learning. Here, since it is not possible for the NN to learn a game log as is, data that is to be learned by the NN must have an n-dimensional tensor data structure. N-dimensional tensor data is arrayed data that is handled as an n-dimensional array during processing according to a program. It should be understood that the number of layers and the number of nodes in the NN shown in FIG. 2 are merely examples.

Figure 1:
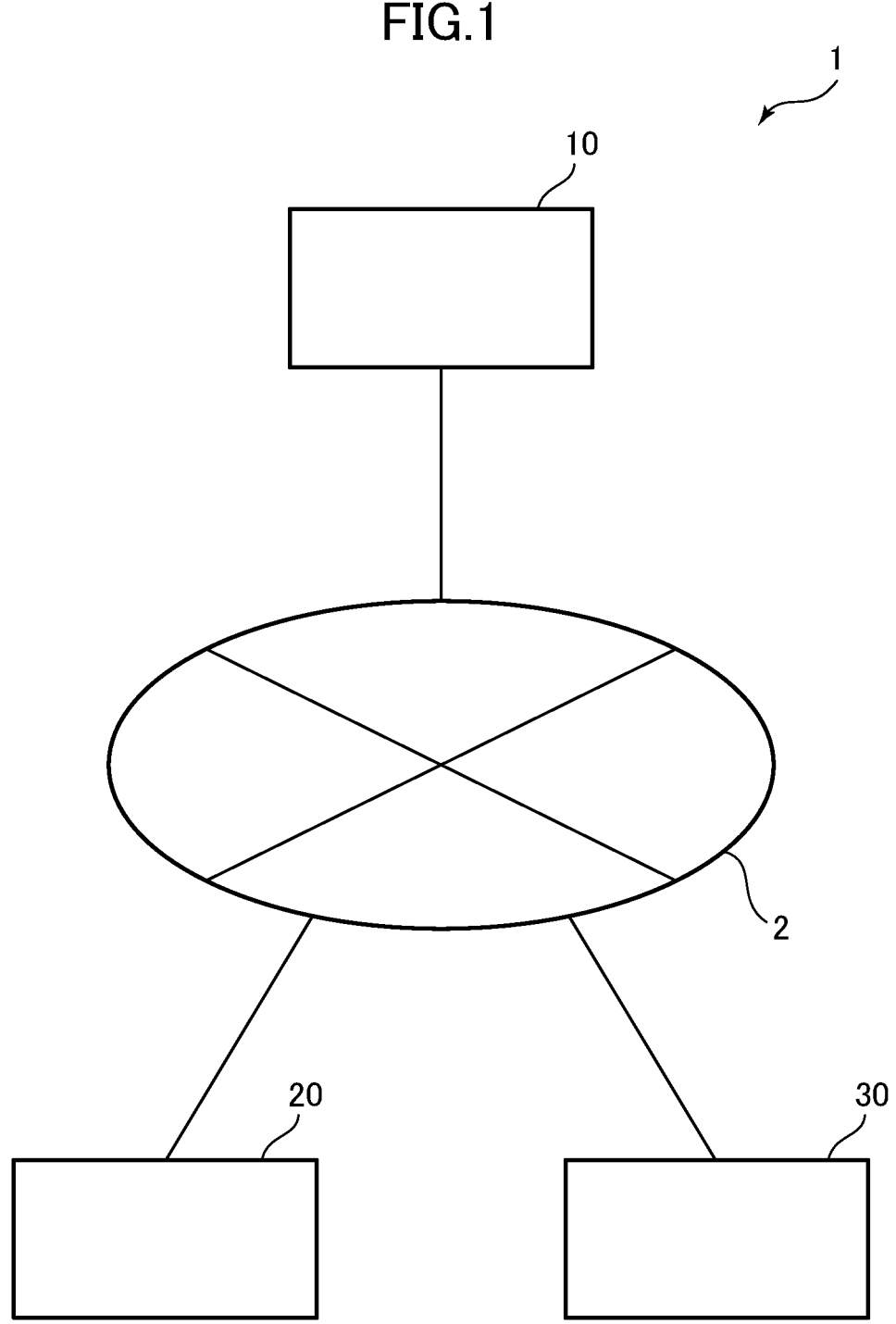
FIG. 1 is an overall configuration diagram of an inspection system according to an embodiment of the present invention.

FIG. 1 is an overall configuration diagram of the inspection system 1 according to the embodiment of the present invention. As shown in FIG. 1, the inspection system 1 includes an information processing device 10, a game server 20, and an inspection server 30, which are connected to a network 2 such as the Internet so as to allow mutual communication.

Figure 3:
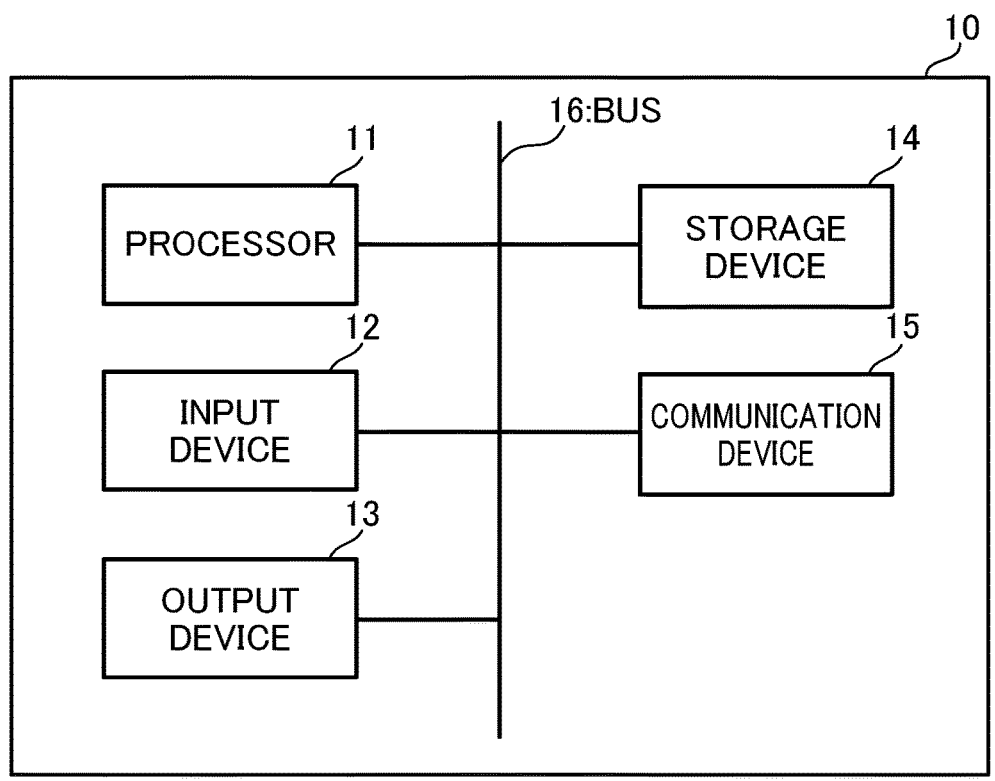
FIG. 3 is a block diagram showing the hardware configuration of an information processing device according to the embodiment of the present invention.

FIG. 3 is a block diagram showing the hardware configuration of the information processing device 10 according to the embodiment of the present invention. The information processing device 10 according to this embodiment includes a configuration similar to that of an ordinary server, PC, or the like. The information processing device 10 includes a processor 11, an input device 12, an output device 13, a storage device 14, and a communication device 15. These constituent devices are connected via a bus 16. It is assumed that interfaces are interposed, as needed, between the bus 16 and the individual constituent devices. In one example, the information processing device 10 is configured to include a plurality of computers or server devices.

The processor 11 controls the overall operation of the information processing device 10, and for example, the processor 11 is a CPU and a GPU. In order to perform machine learning, the information processing device 10 preferably includes a GPU for executing general processing other than graphic rendering. With this configuration, it becomes possible to improve the computation speed, for example, by simultaneously running more than 1,000 cores to execute parallel processing. The processor 11 executes various kinds of processing by loading programs and data stored in the storage device 14 and executing the programs.

The input device 12 is a user interface that accepts inputs to the information processing device 10 from a user. For example, the input device 12 is a touchscreen, a touchpad, a keyboard, or a mouse. The output device 13 outputs or displays information output from the information processing device 10 to the user. For example, the output device 13 is a display or a printer that outputs an image.

The storage device 14 includes a main storage device and an auxiliary storage device. The main storage device is a semiconductor memory, such as a RAM. A RAM is a volatile storage medium that allows high-speed information reading and writing, and is used as a storage area and a work area when the processor 11 processes information. The main storage device may include a ROM, which is a read-only, non-volatile storage medium. In this case, the ROM stores programs such as firmware. The auxiliary storage device stores various programs and data that is used by the processor 11 when the individual programs are executed. The auxiliary storage device is, for example, a hard disk device; however, the auxiliary storage device may be any type of non-volatile storage or non-volatile memory, which may be of the removable type, that is capable of storing information. The auxiliary storage device stores, for example, an operating system (OS), middleware, application programs, various kinds of data that may be referred to as these programs are executed, and so forth.

The communication device 15 sends data to and receives data from other computers via the network 2. For example, the communication device 15 connects to the network 2 by carrying out wired communication using an Ethernet (registered trademark) cable or the like or wireless communication such as mobile communication or wireless LAN communication.

Figure 4:
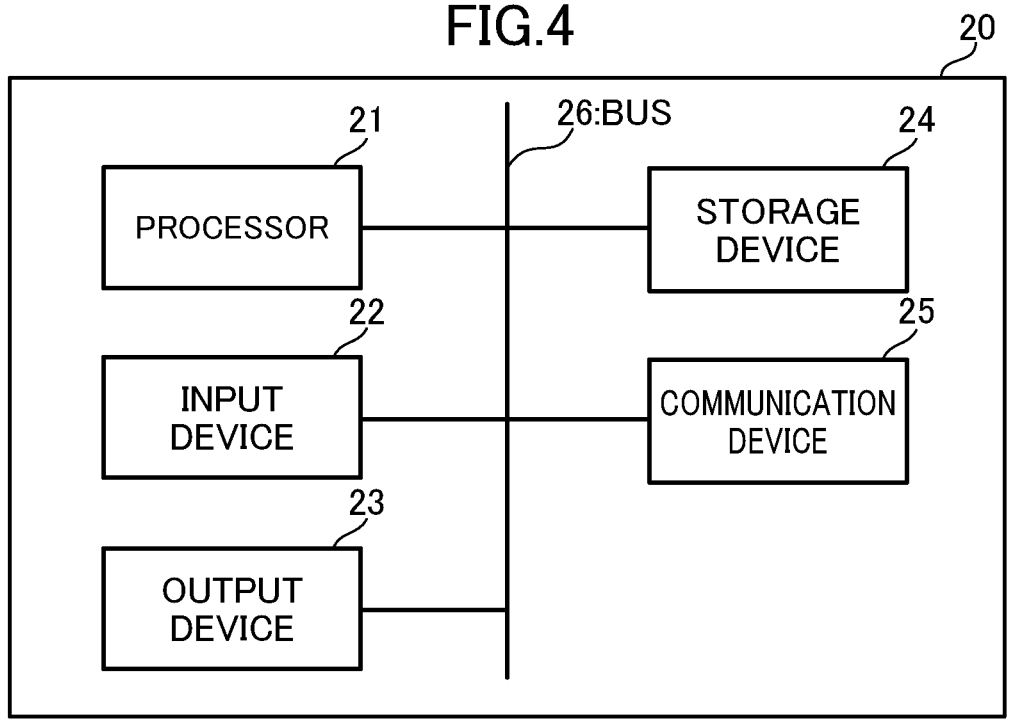
FIG. 4 is a block diagram showing the hardware configuration of a game server according to the embodiment of the present invention.

FIG. 4 is a block diagram showing the hardware configuration of the game server 20 according to the embodiment of the present invention. The game server 20 according to this embodiment includes a configuration similar to that of an ordinary server. In one example, the game server 20 is a known server computer. The game server 20 includes a processor 21, an input device 22, an output device 23, a storage device 24, and a communication device 25. These constituent devices 26 are connected via a bus 26. It is assumed that interfaces are interposed, as needed, between the bus 26 and the individual constituent devices. The individual components, namely, the processor 21, the input device 22, the output device 23, the storage device 24, and the communication device 25 respectively correspond to the processor 11, the input device 12, the output device 13, the storage device 14, and the communication device 15 described earlier and have similar configurations, and thus descriptions thereof will be omitted. In one example, the game server 20 is configured to include a plurality of server devices.

The game server 20 is connected via a network to terminal devices of individual users who play a game. The terminal devices of the users are preferably smartphones but may be personal computers, tablets, mobile phones, or the like.

For example, when the individual users activate a game app installed on the terminal devices, the terminal devices access the game server 20, and the game server 20 accepts accesses from the individual terminals and provides a game service via the network. At this time, the game server 20 stores game information including game logs of the individual users in the storage unit 24 and manages the game information. In this embodiment, the game server 20 has the functionality of a database server. In this case, the storage device 24 stores data (e.g., tables) and a program for a database, and a database is realized by executing the program. In the case where the game server 20 is configured to include a plurality of server devices, one or more of the server devices may be database servers. The network to which the game server 20 and the terminal devices of the individual users are connected may be the network 2.

The storage device 24 of the game server 20 stores a game program, which is an application for a game, and the game server 20 provides the game by communicating with the terminal devices of the individual users. The game server 20 executes the game in accordance with game operation inputs at the terminal devices of the users and sends the results of execution to the terminal devices of the users.

The game provided by the game server 20 in this embodiment is what is called a collectible card game. Specifically, in the game in this embodiment, each user selects a card from an owned card set constituted of a plurality of cards and places the card on a game field, and various events are executed in accordance with combinations of cards and classes, whereby the game progresses. Furthermore, the game in this embodiment is a battle game in which a plurality of users play a battle by selecting cards from their owned cards sets and placing the cards on a game field 43. In the game in this embodiment, each card has card definition information including a card ID, a card type, and parameters such as hit points, an attacking power, and attributes. Each class has class definition information. The card type is information indicating whether the card represents a character or an item.

Figure 5:
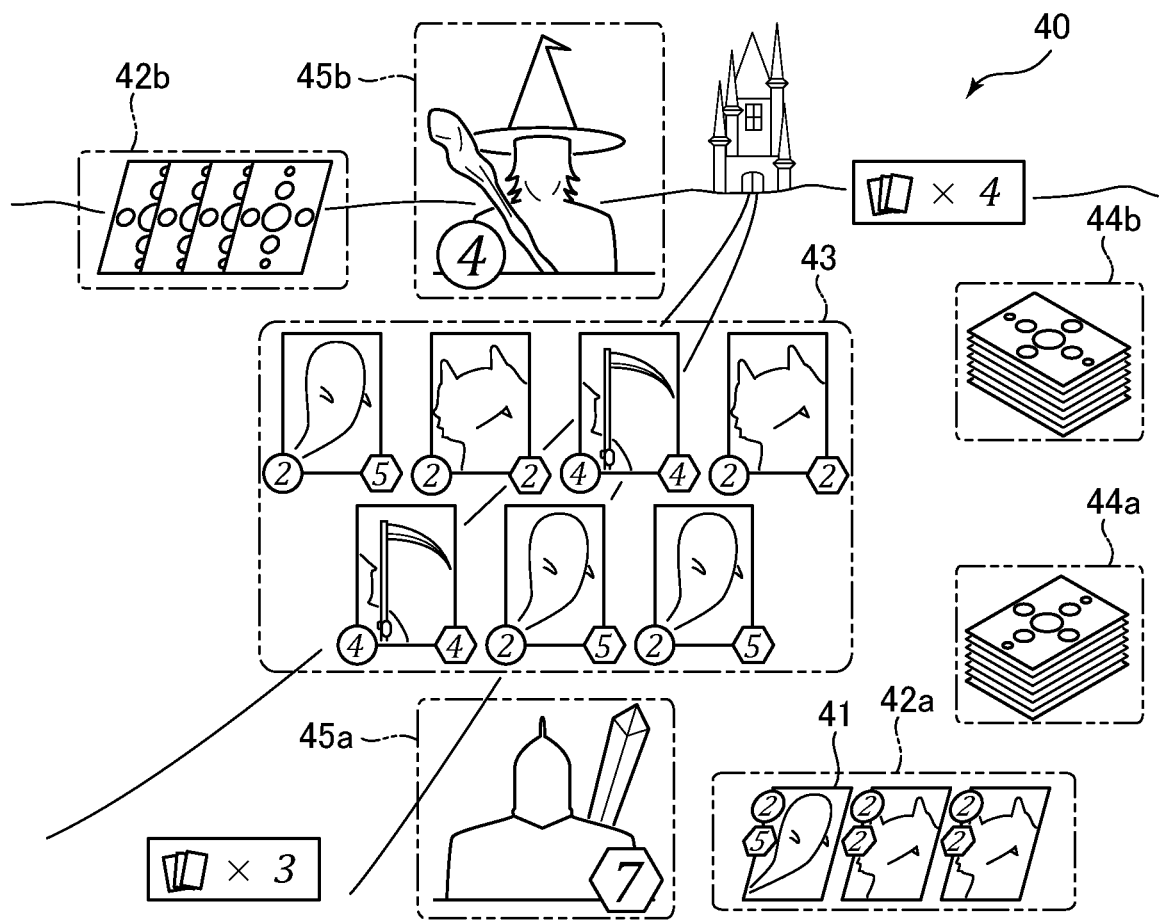
FIG. 5 shows an example of a game screen displayed on a display of a terminal device of a user.

FIG. 5 shows an example of the game screen displayed on a display of the terminal device of a user, specifically, a game screen 40 for a card battle between the local user, i.e., the user himself or herself who operates the user terminal device, and another user who operates the user terminal device of that user. The game screen 40 shows a first card set 42a, which is the hand of the local user, and a first card set 42b, which is the hand of the other user. The game is configured so that the local user cannot observe the content of the first card set 42b of the other user.

The owned card set owned by each user is constituted of a first card set 42, which is the hand of the user, and a second card set 44, which is the stock of the user, and is generally referred to as a card deck. Whether each card 41 owned by the user is included in the first card set 42 or the second card set 44 is determined in accordance with the progress of the game. The first card set 42 is a set of cards that can be selected by the user and that can be placed on the game field 43, whereas the second card set 44 is a set of cards that cannot be selected by the user. Although the owned card set is constituted of a plurality of cards 41, there are cases where the owned card set is constituted of a single card 41 depending on the progress of the game. The game progresses while the individual users place cards 41 on the game field 43 from their individual first card sets 42 (42a and 42b). The card deck of each user may be constituted of cards 41 of all different kinds or may be constituted by partially including cards 41 of the same kind. Furthermore, the kinds of cards 41 constituting the card deck of the local user may be different from the kinds of cards 41 constituting the card deck of the other user. In another example, the owned card set owned by each user is constituted of only the first card set 42.

The game screen 40 shows a character 45a selected by the local user and a character 45b selected by the other user. In this embodiment, the character selected by a user differs from a character associated with a card, and defines a class representing the type of the owned card set. The game in this embodiment is configured such that the cards 41 owned by a user vary depending on the class. In one example, the game in this embodiment is configured such that the kinds of cards that may constitute the card deck of each user vary depending on the class. In one example, the game in this embodiment is configured such that the effect exhibited by placing a card 41 on the game field 43 varies depending on the parameters set in the card definition information.

Alternatively, media (medium set) such as characters and items may be used instead of the cards 41 (card set), and an owned medium set configured to include a plurality of media owned by a user may be used instead of the owned card set. For example, in the case where the medium set is constituted of media including characters and items, the game screen 40 shows the characters or items themselves as the cards 41. Furthermore, in this description, it is assumed that a game state represents the state of the game as a whole at a point in time or a scene. The game state is configured to include information about the game field 43 and information about the owned card set. Specifically, it suffices that the game state in this embodiment include at least information about the cards 41 placed on the game field 43 and information about the cards 41 in the owned card set (or the first card set 42) of the local user at a point in time (in a scene). For example, when the local user places card A1 on the game field 43 from the first card set 42a, card A1 becomes absent from the owned card set, and it is possible to confirm from the game state that card A1 has been placed on the game field 43.

In one example, the game in this embodiment is a battle game in which a single battle (card battle) includes a plurality of turns), and the game progresses while the local user or the other user selects a card from the first card set 42 and places the card on the game field 43 in each turn. In one example, the character 45*b* is a non-player character. In one example, in the game in this embodiment, in response to a user operation involving a card or character on the game screen 40, a parameter of another card or character, such as the hit points or the attacking power, is changed. In one example, in the game in this embodiment, when a predetermined condition is satisfied, for example, when a specific game state occurs, a card is placed on the game field 43 from the card decks of the individual users or from somewhere other than the card decks of the individual users. In one example, in the game in this embodiment, when a predetermined condition is satisfied, for example, when a specific game state occurs, a card corresponding to the predetermined condition is excluded from the game field or is transferred to the card deck of the local user or the other user. In one example, in the game in this embodiment, when a specific card, such as a spell card, is placed on the game field 43 from the card deck of each user, a predetermined effect is exhibited, and the specific card is made to vanish from the game field 43.

Figure 6:
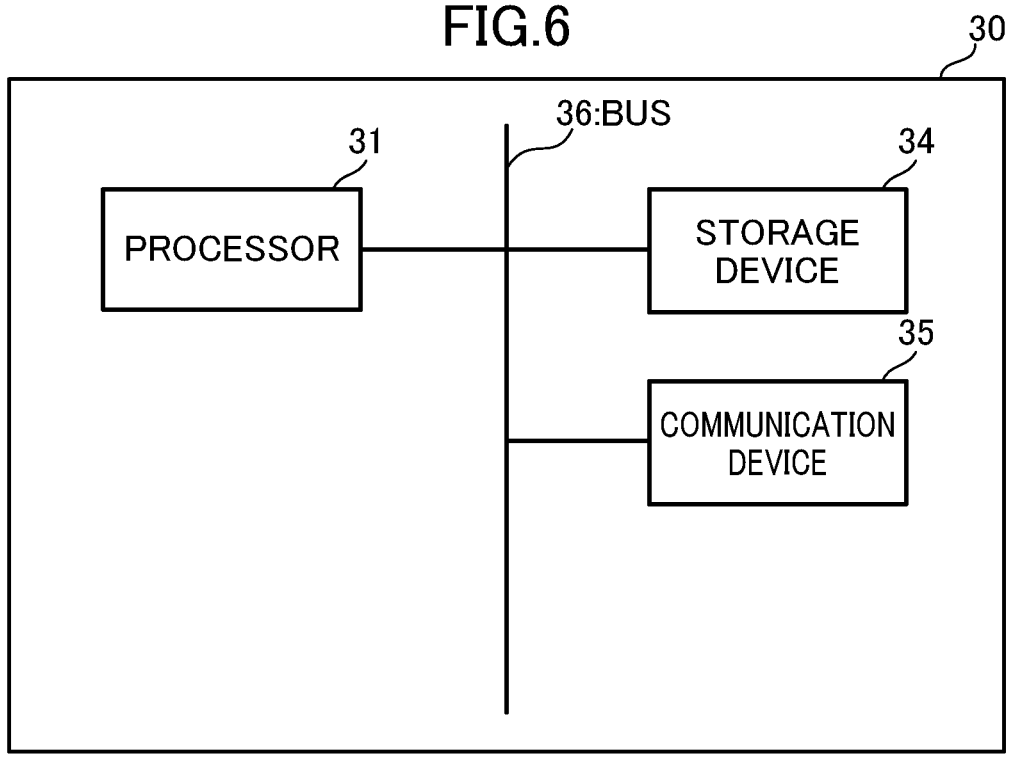
FIG. 6 is a block diagram showing the hardware configuration of an inspection server according to the embodiment of the present invention.

FIG. 6 is a block diagram showing the hardware configuration of the inspection server 30 according to the embodiment of the present invention. The inspection server 30 according to this embodiment includes a configuration similar to that of an ordinary server. In one example, the inspection server 30 is a known server computer. The inspection server 30 includes a processor 31, a storage device 34, and a communication device 35. These constituent devices are connected via a bus 36. It is assumed that interfaces are interposed, as needed, between the bus 36 and the individual constituent devices. The individual components, namely, the processor 31, the storage device 34, and the communication device 35 respectively correspond to the processor 11, the storage device 14, and the communication device 15 described earlier and have similar configurations, and thus descriptions thereof will be omitted. In one example, the inspection server 30 is configured to include a plurality of server devices.

Although the inspection server 30 is configured not to include input/output devices so as to increase the speed of processing by adopting a headless implementation, the inspection server 30 may include input/output devices. Furthermore, the information processing device 10 or the game server 20 may be configured to have the functionality of the inspection server 30.

In one preferred example, the inspection server 30 is a server system that concurrently executes a plurality of game apps (game programs) isolated from other processes. The inspection server 30 virtualizes the abovementioned game apps by using a technology called a "container", such as docker, which is a virtualization technology at the OS level. With this configuration, it becomes possible with a single server device to simultaneously execute a plurality of apps in parallel.

Furthermore, with the abovementioned virtualized game programs, the inspection server 30 executes the game programs in the headless mode or executes headless game programs. Since the headless game programs do not require graphics or sound, which may be factors that limit the speed, it becomes possible to execute the game content of the game programs at high speed in a short time with the processor 31 alone. This makes it possible to efficiently perform dynamic inspection involving the execution of game programs.

In this embodiment, the inspection server 30 has the functionality of a database server. In this case, the storage device 34 stores data (e.g., tables) and a program for a database, and the database is realized by executing the program. In the case where the inspection server 30 is configured to include a plurality of server devices, one or more of the server devices may be database servers.

Figure 7:
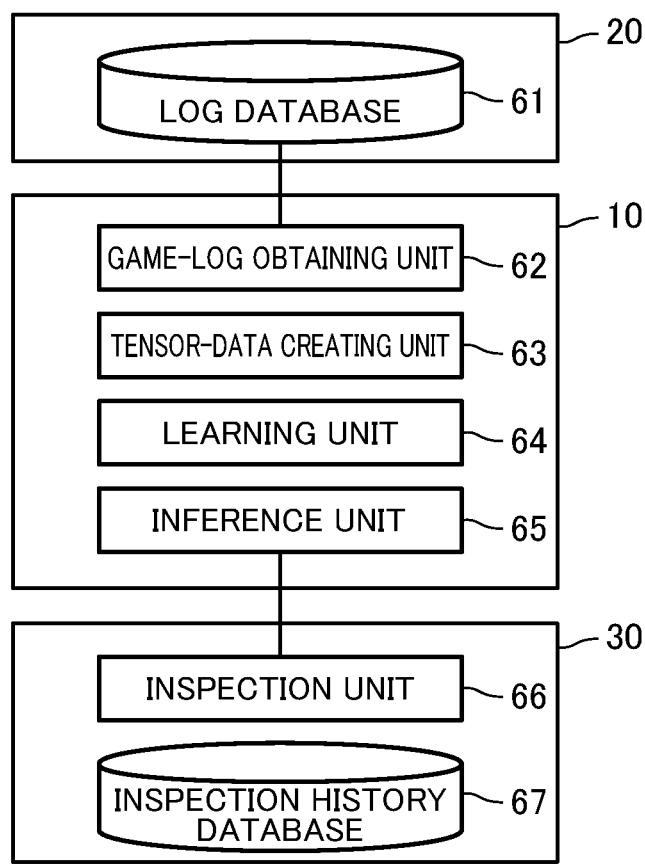
FIG. 7 shows an example functional block diagram of the inspection system according to the embodiment of the present invention.

FIG. 7 shows an example functional block diagram of the inspection system 1 according to the embodiment of the present invention. These functions are realized by executing programs in the processors 11, 21, and 31 of the individual devices. In this embodiment, since various functions are realized by loading programs, a portion of one part (functionality) may be provided in another part. Alternatively, these functions may be realized by hardware by configuring an electronic circuit or the like for realizing the functions in part or in whole.

As shown in FIG. 7, the game server 20 includes a log database 61. Each time a user plays the game, the game server 20 additionally stores a game log indicating the status of progress of the game in the log database 61. The game log includes card information regarding cards included in a game state, which is created in accordance with user operations.

FIG. 8 shows an example of game logs stored in the log database 61. As shown in FIG. 8, the game logs are constituted of logs each indicating the status of progress of the game, such as "operation log X1 of user X". The game server 20 sequentially stores logs in the log database 61 over time. Each log, such as "operation log X1 of user X", includes information such as time information, a user ID for identifying a user, an operation type, and a sequence number, and allows a user action to be recorded therein. Although the game logs are used by the information processing device 10 in this embodiment, the game logs are used for a wide range of purposes, including problem handing and customer support. Thus, by using the information included in a game log, it is possible to grasp card information about the game field 43 and card information about the owned card set (or the first card set 42) in the game state at the time of acquisition of the game log.

As shown in FIG. 7, the information processing device 10 includes a game-log obtaining unit 62, a tensor-data creating unit 63, a learning unit 64, and an inference unit 65. The game-log obtaining unit 62 obtains game logs from the log database 61.

The tensor-data creating unit 63 creates tensor data by creating array data in which card information matrices representing card information included in game states are arrayed along the time axis on the basis of the game logs obtained by the game-log obtaining unit 62. The tensor-data creating unit 63 maps matrices representing game states at certain points in time to a tensor structure that makes it possible to extend the game logs, thereby generating data that allows machine learning. A card information matrix after an action taken by the user represents the action taken by the user relative to a card information matrix before the action taken by the user, and thus can be used as a correct label. This correct label is used to infer a card that would be selected by a majority of users in a given game state.

FIGS. 9 and 10 show examples of a card information matrix at a point in time. In a card information matrix, rows represent the kinds of cards provided in the game, columns represent the game field 43 and the type of the owned card set, and information about the presence or absence of a card is stored in each element of a matrix at a certain point in time, i.e., in a certain game state. Alternatively, information about the quantity of cards may be stored in each element of a matrix.

For example, in the card information matrix shown in FIG. 9, "1" is stored for card A1 on the stage, and "0" is stored for card A2 on the stage. This indicates that card A1 is placed on the game field 43 and card A2 is not placed on the game field 43 in this game state. Similarly, in the card information matrix shown in FIG. 9, "0" in stored for card A1 in the deck, and "1" is stored for card A2 in the deck. This indicates that the owned card set does not include card A1 and includes card A2 in this game state.

As described above, a card information matrix is an n-dimensional vector corresponding to n kinds of card, representing card information about the game field 43 and card information about the owned card set of a user in one battle at a certain point in time. In this embodiment, the card information about the owned card set in the card information matrix is the owned card set of the local user and does not include the owned card set of the other user. Depending on the content of the game, however, the card information matrix may be configured to include the owned card set of the other user. The rows and columns of the card information matrix may be exchanged.

FIG. 10 shows a card information matrix after the user places card A2 on the game field 43 in the game state in FIG. 9. In the card information matrix shown in FIG. 10, compared with the card information matrix in FIG. 9, the information stored for card A2 on the stage is changed from "0" to "1", and the information stored for card A2 in the deck is changed from "1" to "0".

As described above, by using card information matrices, when a change occurs in the card information about the game field 43 and the card information about the owned card set as a result of an action taken by the user, such as a card selecting operation, it is possible to detect the change as a change in the values in the matrix. Alternatively, as a modification, the elements of a row in a card information matrix may be the game field 43 and the first card set 42, or the game field 43, the owned card set, and the first card set 42.

Figure 11:
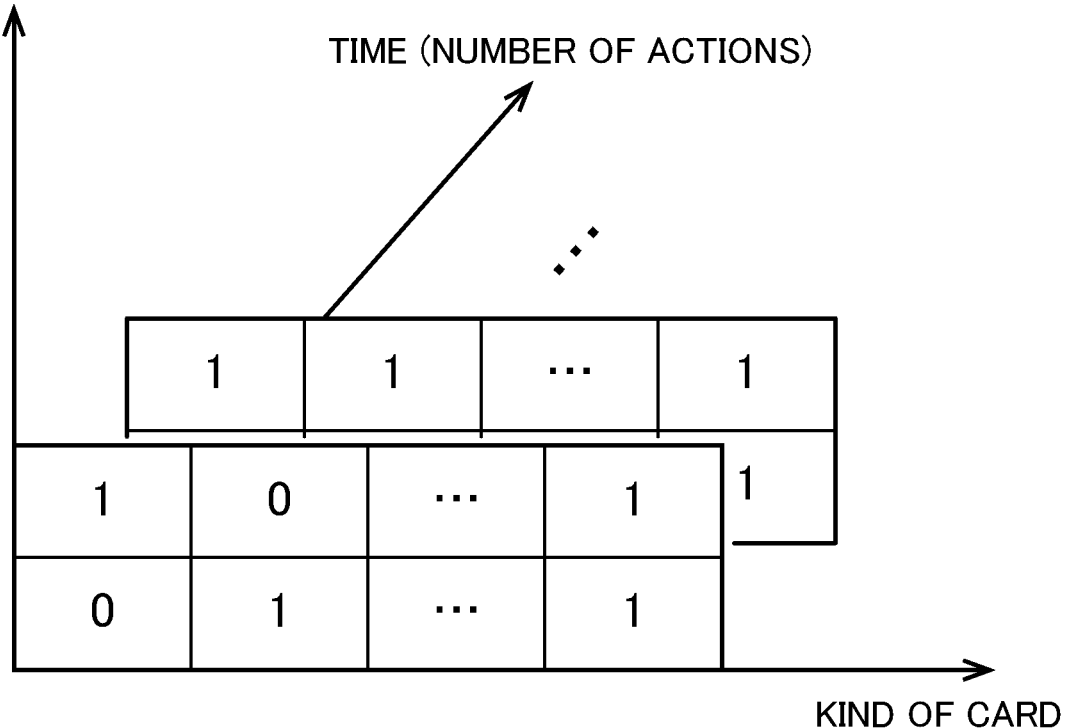
FIG. 11 shows an example of three-dimensional array data created by a tensor-data creating unit.
Figure 12:
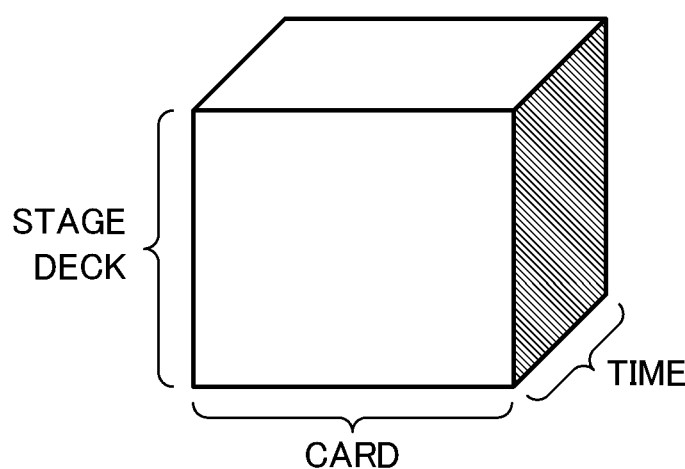
FIG. 12 shows an example of three-dimensional array data created by the tensor-data creating unit.

The tensor-data creating unit arrays card information matrices for all actions along the time axis, as shown in FIG. 11, thereby creating three-dimensional array data, such as the one shown in FIG. 12, for each card battle. Thus, each card battle is represented by a three-dimensional tensor having an axis for the distinction regarding the stage/deck (the game field 43/owned card set), an axis for the kind of card, and the time axis representing the number of actions.

Figures 13, 14:
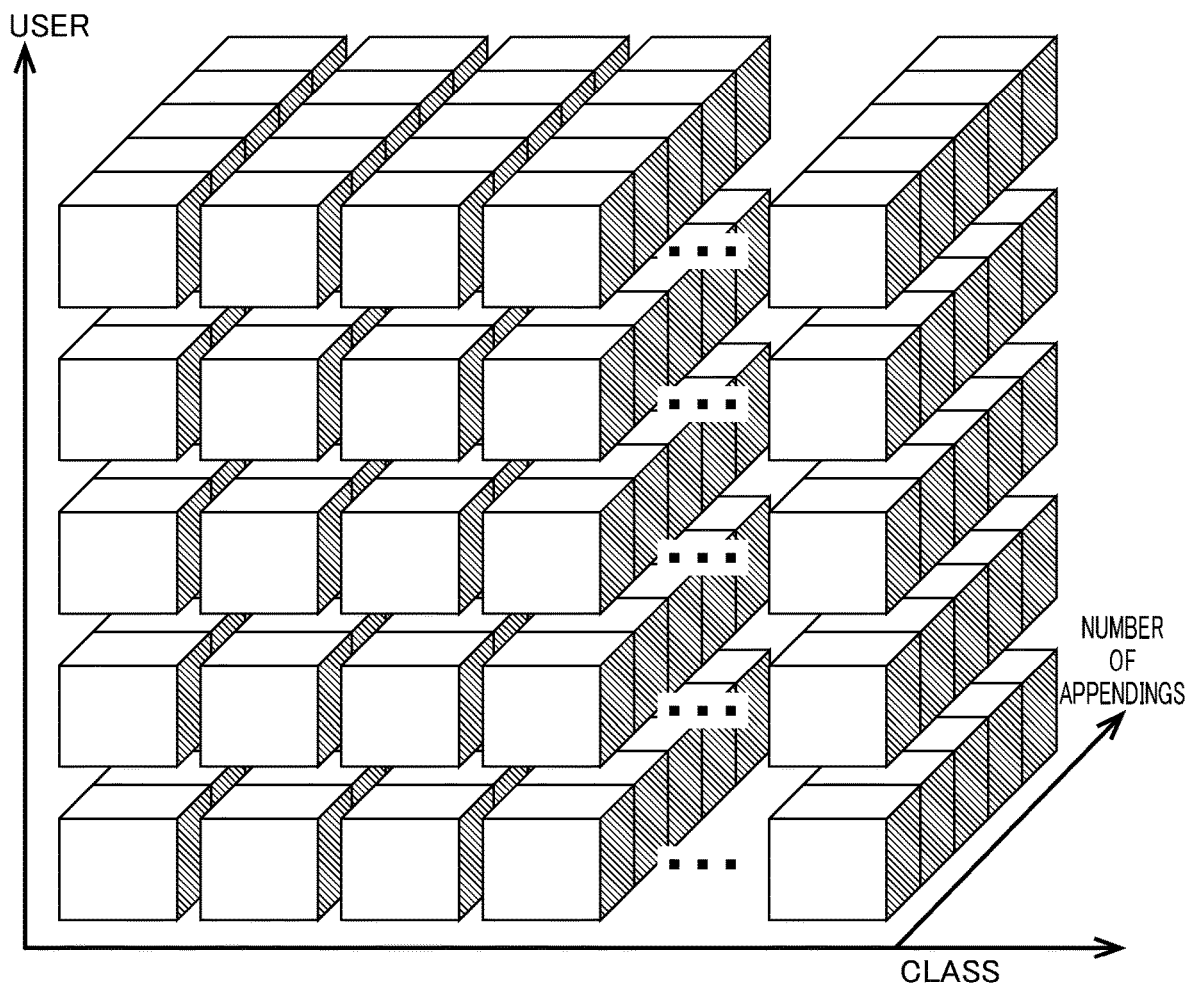
FIG. 13 shows an example of a tensor data model in which three-dimensional array data is disposed along three axes, namely, a user axis, a number-of-appendings axis, and a class axis.
FIG. 14 shows an example of a transformation matrix representing the relationship between existing cards and new cards.

Here, since a game log includes a user ID and a class, the tensor-data creating unit 63 can accumulate three-dimensional array data as classified for each user, for each class, and for each number of times that appending is performed. The tensor-data creating unit 63 further creates tensor data by storing three-dimensional array data for each user along the user axis representing the kind of user, for each number of times that appending is performed along the number-of-appendings axis representing the number of times that appending is performed, and for each class along the class axis representing the kind of class. FIG. 13 shows an example of a tensor data model in which three-dimensional array data is disposed along the user axis, the number-of-appendings axis, and the class axis.

Thus, the tensor data created by the tensor-data creating unit 63 is six-dimensional tensor data storing the distinction regarding the stage/deck, the kind of card, the number of actions, the kind of user, the number of times that appending is performed, and the kind of class. Here, the number of times that appending is performed refers to the number of times that five-dimensional tensor data other than the number of times that appending is performed was appended when the tensor-data creating unit 63 created the six-dimensional tensor data. Since the five-dimensional tensor data is generated for each card battle, as a result, the number of times that appending is performed indicates the number of battles.

Alternatively, the tensor data may be configured as in the following modifications. In one modification, the tensor data created by the tensor-data creating unit 63 is the three-dimensional array data described above, i.e., three-dimensional tensor data. In one modification, the tensor data created by the tensor-data creating unit 63 is four-dimensional tensor data in which the three-dimensional array data is disposed along one of the user axis, the number-of-appendings axis, and the class axis. In one modification, the tensor data created by the tensor-data creating unit 63 is five-dimensional tensor data in which the three-dimensional array data is disposed along two of the user axis, the number-of-appendings axis, and the class axis. Alternatively, the tensor data created by the tensor-data creating unit 63 may be n-dimensional (n≥4) tensor data in which one or more dimensions are added to the tensor data described above.

In the log database 61, information is continuously and additionally stored while the users are playing the game. In one preferred example, the information processing device 10 further includes a tensor-data-difference detecting unit. The tensor-data-difference detecting unit extracts an added portion of a game log, for example, by comparing the time of last update of the tensor data created by the tensor-data creating unit 63 with the time of acquisition of the game log by the game-log obtaining unit 62. Thus, the tensor-data creating unit 63 creates array data on the basis of a game log newly obtained by the game-log obtaining unit 62, thereby creating tensor data. The functionality of the tensor-data-difference detecting unit may be provided in the game-log obtaining unit 62 or the tensor-data creating unit 63.

In one modification, the tensor-data creating unit 63 creates tensor data from the array data having the three-dimensional structure shown in FIG. 12 by using a system for efficiently storing a sparse matrix, such as ND4J. This makes it possible to overcome the problem of poor memory space efficiency wherein, since tensor data has a multidimensional structure, if the tensor data is stored simply in the form of a multidimensional array, most of the cells in the array would be zero.

In the above example, for convenience of explanation, it is assumed that the tensor-data creating unit 63 stores either "0" or "1" in each element of a card information matrix in accordance with the presence or absence of a card; however, there is no limitation to this example. However, in order to create tensor data as data that allows machine learning, the tensor-data creating unit 63 should preferably store a real value in the range of "$^{1}$" to "1" in each element of a card information matrix in accordance with the presence or absence and the number of cards. For example, in the case where the maximum number of cards that can be included in the stage is five and the stage does not include card A1, includes a card A2, and includes three cards A3, the tensor-data creating unit 63 stores "0" in the element for card A1 on the stage, stores "0.2" in the element for card A2 on the stage, and stores "0.6" in the element for card A3 on the stage.

The learning unit 64 performs machine learning by using the created tensor data as learning data, thereby generating a neural network model. The learning data is constituted of output data including pairs consisting of input data and correct labels for the input data. For example, in the case where the tensor data created by the tensor-data creating unit 63 is three-dimensional array data, among the card information matrices adjacent to each other along the number of actions, the card information matrix with a fewer number of actions serves as input data, and the card information matrix with a greater number of actions serves as output data. That is, the card information matrix at a certain point in time serves as output data for a card information matrix serving as input data with one fewer number of actions, and serves as input data for a card information matrix serving as output data with one greater number of actions.

The learning unit 64 can generate a neural network model by using a known neural network. The neural network in this embodiment may include a multilayer neural network, i.e., a deep learning neural network. Preferably, the learning unit 64 uses a deep neural network having two or more intermediate layers, such as the one shown in FIG. 2. For example, the learning unit 64 may use a framework such as Deeplearning4j (registered trademark), TesorFlow (registered trademark), or Chainer (registered trademark). Alternatively, the learning unit 64 may create a learning model other than a neural network model, such as a learning model based on the random forest method.

The inference unit 65 infers a card that will be selected by a user in a given game state by using the neural network model (learning model) generated by the learning unit 64. Card information in the game state at a certain point in time is represented by a card information matrix. For example, in the case where the tensor-data creating unit 63 creates three-dimensional tensor data, the inference unit 65 infers (outputs) a card that will be selected next by the user when a card information matrix representing the game state at a certain point in time is input thereto.

In one example, the inference unit 65 outputs (determines) a card having the highest likelihood by comparing the likelihoods of cards that can be selected by the user with a predetermined threshold. Specifically, the inference unit 65 outputs inference information, which is information regarding cards having likelihoods greater than or equal to a predetermined threshold (or greater than a predetermined threshold). The inference information includes information (e.g., card IDs) about cards having likelihoods greater than or equal to a predetermined threshold. The inference information may include information about likelihoods for the individual card IDs, or the inference unit 65 may output cards in descending order of the likelihoods thereof. In this embodiment, it is assumed that a card becomes more likely as the likelihood thereof becomes higher. Alternatively, as a modification, a setting may be defined such that a card becomes more likely as the likelihood thereof becomes lower. In this case, the inference unit 65 outputs cards having likelihoods less than or equal to a predetermined threshold (or less than a predetermined threshold). The threshold is set in advance by a game administrator or the like. The threshold is preferably determined so that the cards output by the inference unit 65 will be not greater than 10% of all the cards that can be selected by the user. This makes it possible to prevent a situation where the inference unit 65 continues to determine only one card in a game state. In this case, the inference information output by the inference unit 65 is not limited to the above example as long as the information relates to cards having high likelihoods of being selected by the user in the relevant game state. The inference unit 65 can infer (output) data by using a known inference execution module that can infer data by using a constructed learning model. For example, the inference unit 65 can use a framework such as CoreML.

In one example, when one or more new kinds of card are added to the game by a game administrator or the like, the inference unit 65 infers a card that will be selected by the user in a given game state by further using a transformation matrix representing the relationship between the cards being added and the cards provided in the game before the addition. FIG. 14 shows an example of a transformation matrix representing the relationship between an existing card pack A currently provided in the game and a new card pack B. By using this transformation matrix as a filter at the input and output, the inference unit 65 infers a card likely to be selected by the user among the new card pack, for which there is no learning data. With this configuration, when newly adding cards to the game, it becomes possible to efficiently perform debugging for the added cards, for which game logs have not been obtained. The transformation matrix is set by a game administrator or the like in view of the essence of the specifications and functions of the cards. For example, with the transformation matrix shown in FIG. 14, a new card B1 is a card constituted of the existing card A1 at a ratio of 0.9 and an existing card An at a ratio of 0.1, which suggests that the new card B1 has substantially the same essence of specifications and function as the existing card A1. The new card pack B may include not only the newly added cards but all the kinds of card provided in the game, including the newly added cards. In another example, the inference unit 65 uses the transformation matrix as a filter only at the input or at the output. In another example, when performing machine learning by using the created tensor data as learning data, the learning unit 64 regenerates learning data by applying the transformation matrix as a filter to the tensor data, thereby generating a neural network model. With this configuration, it becomes possible to generate a neural network model in which information about a new card pack not included in game logs is reflected.

As shown in FIG. 7, the inspection server 30 includes an inspection unit 66 and an inspection history database 67. The inspection unit 66 inspects a game program by executing the game program with cards estimated by the inference unit 65 as card choices by the user in game states as the game progresses.

Specifically, the inspection unit 66 executes the game program, and when a user has to select a card, the inspection unit 66 passes information about the current game state, e.g., a card information matrix, to the inference unit 65. The inference unit 65, by using the generated learning model, infers a card that will be selected next by the user from the card information matrix received from the inspection unit 66, and passes the information to the inspection unit 66. The inspection unit 66 inspects the game program by executing the game program while using the cards output by the inference unit 65 as cards selected by the user. Preferably, the inspection unit 66 inspects the game program by executing the game program while sequentially using the cards output from the inference unit 65, as card choices by the user, in descending order of the likelihoods thereof. The inspection unit 66 repeats the above operation to detect a bug when an arbitrary inconsistency is detected, when an explicit exception, such as a segmentation fault, is detected by the OS, and so forth. In one example, since games provided as ordinary commercial products are provided with a function for detecting inconsistencies, the inspection unit 66 detects bugs by using the inconsistency detecting function generally provided in games.

The inspection history database 67 stores information about the game state actually inspected by the inspection unit 66 by executing the game program, as well as card information used as the card selected by the user at that time. By referring to the inspection history database 67, for example, it becomes possible for the inspection unit 66 to avoid executing the game program while reselecting a card previously used as the card selected by the user in a given game state.

FIG. 15 shows an example flowchart of an inspection process by the inspection server 30 and the information processing device 10 according to this embodiment. First, in step 101, the inspection server 30 executes the game program. Then, when card selection by a user becomes necessary, in step 102, the inspection server 30 sends information about the game state at that time to the information processing device 10. In one preferred example, information about the game state at that time is a card information matrix at that time.

Then, in step 103, the information processing device 10 receives the information about the game state, and determines the rank of cards to be selected by the user by considering the information as an input and using a generated NN model. At this time, the information processing device 10 determines cards having likelihoods of being selected by the user greater than or equal to a threshold and sorts the determined cards in descending order of the likelihoods thereof. For example, the information processing device 10 assigns numbers "0"-th, "1"-st, and so forth in order from cards having higher likelihoods of being selected by the user. The numbers are assigned for each game state. By leaving room for selecting a card other than the card having the highest likelihood, it becomes possible to prevent the information processing device 10 from continuously determining only one card as a card to be selected by the user in a game state.

Then, in step 104, the information processing device 10 selects the i-th card among the ranked cards. Here, since the cards are selected in descending order of the possibilities of being selected by the user, the initial value of i is "0".

Then, in step 105, the information processing device 10 sends query data to the inspection server 30 as to whether or not the combination of the information about the game state and the selected card information is stored in the inspection history database 67, and the inspection server 30 responds to the query. The process proceeds to step 108 in the case where the combination of the information about the game state and the selected card information is not stored in the inspection history database, and proceeds to step 106 in the case where the combination is stored.

In step 106, the information processing device 10 determines whether the (i+1)-th ranked card, next to the i-th card selected in step 104, is present or absent. In the case where the card is present, the inspection process proceeds to step 107, in which i is incremented by one, and the process returns to step 104. In the case where the card is absent the inspection process proceeds to step 108. Here, in the case where the inspection process proceeds to step 108, the information processing device 10 preferably resets the value of i to the initial value and selects the 0-th card among the ranked cards.

In step 108, the information processing device 10 sends information about the selected card to the inspection server 30.

Then, in step 109, the inspection server 30 receives the information about the selected card, performs an operation for selecting the card, and executes the game program.

Then, in step 110, the inspection server 30 returns to step 101 in the case where the game program is to be executed continuously, and terminates the inspection process in the case where the execution of the game program is to be terminated. For example, the inspection server 30 terminates the inspection process in the case where an arbitrary inconsistency is detected or in the case where the game program is terminated as a result of an abnormality, as in the case where an explicit exception, such as a segmentation fault, is detected by the OS. Preferably, the inspection server 30 is configured to send information about bug detection to a personal computer of an administrator, connected to the inspection server 30 via a network, in the case where a bug is detected, as described above.

Next, the main operations and advantages of the inspection system 1 according to this embodiment will be described. In this embodiment, for example, the tensor-data creating unit 63 creates tensor data having the structure shown in FIG. 13 from game logs that are accumulated in accordance with the status of the progress of the game and that include card information about the game field 43 and the owned card set. The learning unit 64 performs machine learning by using tensor data created in a format that allows machine learning, thereby generating an NN model (learning model). The inference unit 65 infers a card that will be selected by the user in a given game state by using the generated NN model. The inspection unit 66 inspects the game program by executing the game program while using the cards inferred by the inference unit 65 as cards selected by the user in game states as the game progresses.

As described above, with the configuration in which the tensor-data creating unit 63 creates a tensor data structure that allows machine learning from game logs reflecting user actions, it becomes possible to generate a learning model for inferring a card likely to be selected by a human in a given game state.

Furthermore, in this embodiment, in the tensor data created by the tensor-data creating unit 63, for example, a real value in the range of "0" to "1" is stored in each element in the tensor in accordance with the presence or absence of a card. Thus, with the tensor data structure created by the tensor-data creating unit 63, the structure itself is not affected even in the case where the content of the game is partially changed by the game administrator or the like, for example, in the case where the card definition information is partially changed or in the case where a new kind of card is added. Furthermore, in this embodiment, the information processing device 10 creates tensor data by extracting an added game log and creating three-dimensional array data on the basis of the newly obtained game log. For example, in the tensor data structure shown in FIG. 13, the information processing device 10 stores the newly created three-dimensional array data on coordinates defined by a user axis, a number-of-appendings axis, and a class axis. In this case, in the information processing device 10, the tensor-data creating unit 63 stores three-dimensional array data at a new coordinate on the user axis in the case where a game log is obtained from a new user. Three-dimensional array data also is stored in a similar manner in the case where a game log for a new kind of class or a game log for a new number of battles is obtained. With this configuration, in this embodiment, since the structure of the tensor data created by the tensor-data creating unit 63 is unchanged, it becomes possible to continuously perform learning with the NN model. As described above, the inspection system 1 according to this embodiment adopts an appending model with the presumption that tensor data will be continuously expanded, which makes it suitable for game titles that are run on a long-term basis.

Furthermore, in this embodiment, AI bots that automatically select cards likely to be selected by humans in give game states are realized mainly by the learning unit 64 and the inference unit 65. By performing test plays with the AI bots, it becomes possible for the inspection unit 66 to keep on preferentially discovering bugs having higher probabilities of being encountered by users.

For example, with existing QA, verification is performed with priorities experientially set by engineers for a huge number of combinations of user operation logs, and thus it has been difficult to quantitatively reflect the actual operation tendencies of users. In particular, with online games that are provided continuously, the tendencies of users change with time, and thus there are demands for reflecting the actual tendencies of users in QA processes. With the configuration described above, according to this embodiment, in a card battle game or the like, in which a substantially infinite number of combinations occur, which makes it extremely difficult to perform exhaustive verification by way of manual test play, it becomes possible to preferentially discover bugs having high probabilities of being encountered by users, while reflecting the play tendencies of users. Note that this embodiment does not depend on any specific bug detection method at all, and it is possible to detect bugs attributable to arbitrary causes as long as it is possible to detect the occurrence of bugs themselves on the app side.

Furthermore, when a new card is added to the game, the inference unit 65 infers a card that will be selected by the user in a given game state by further using a transformation matrix representing the relationship between the card being added and a card provided in the game. In the case where a new card for which there is no learning data is added, by using a transformation matrix as a filter at the input/output of an NN model, as described above, it becomes possible for the inspection system 1 to inspect the game program with the card for which there is no game log. This makes it possible to deal with the problem of cold start when adding a new card pack, i.e., the problem that there is a need to perform inference while there is no data to be learned, by using a transformation matrix.

The operations and advantages described above also apply to other embodiments and other examples unless otherwise specifically mentioned.

Another embodiment of the present invention may be a program for realizing the functions or the information processing shown in the flowchart in the above-described embodiment of the present invention, or a computer-readable storage medium storing the program. Furthermore, another embodiment of the present invention may be a data structure of learning data for realizing the functions or the information processing shown in the flowchart in the above-described embodiment of the present invention. Furthermore, another embodiment of the present invention may be an electronic device that realizes, on its own, the functions or the information processing shown in the flowchart in the above-described embodiment of the present invention. Furthermore, another embodiment of the present invention may be a method for realizing the functions or the information processing shown in the flowchart in the above-described embodiment of the present invention. Furthermore, another embodiment of the present invention may be a server that is capable of providing a computer with a program for realizing the functions or the information processing shown in the flowchart in the above-described embodiment of the present invention. Furthermore, another embodiment of the present invention may be a virtual machine for realizing the functions or the information processing shown in the flowchart in the above-described embodiment of the present invention.

In another embodiment of the present invention, the information processing device 10 includes a machine-learning assisting device, a machine learning device, and an inference device. For example, the machine-learning assisting device includes the game-log obtaining unit 62 and the tensor-data creating unit 63, the machine learning device includes the learning unit 64, and the inference device includes the inference unit 65, and these devices are realized individually by computers or the like.

In the processing or operation described above, the processing or operation may be modified freely as long as no inconsistency arises in the processing or operation, such as an inconsistency that a certain step utilizes data that may not yet be available in that step. Furthermore, the examples described above are examples for explaining the present invention, and the present invention is not limited to those examples. The present invention can be embodied in various forms as long as there is no departure from the gist thereof.

REFERENCE SIGNS LIST

1 Inspection system
2 Network
10 Information processing device
11 Processor
12 Input device
13 Output device
14 Storage device
15 Communication device
16 Bus
20 Game server
21 Processor
22 Input device
23 Output device
24 Storage device
25 Communication device
26 Bus
30 Inspection server
31 Processor
34 Storage device
35 Communication device
40 Game screen
41 Card
42 First card set
43 Game field
44 Second card set
45 Character
61 Log database
62 Game-log obtaining unit
63 Tensor-data creating unit
64 Learning unit
65 Inference unit
66 Inspection unit
67 Inspection history database

The invention claimed is:

1. A system for inspecting a game program for a game that progresses as a user selects a medium from an owned medium set configured to include a plurality of media and places the medium on a game field, the system comprising:
  a game-log obtaining unit that obtains a game log from a game server that stores the game log, the game log being created in accordance with a user operation and including medium information regarding the media, the medium information being included in a game state configured to include the game field and the owned medium set;

a tensor-data creating unit that creates tensor data by creating array data in which matrices representing the media information included in the game state are arrayed along a time axis on the basis of the obtained game log;

a learning unit that generates a learning model by performing machine learning while using the created tensor data as learning data;

an inference unit that infers the medium to be selected by the user in a given game state by using the learning model; and an inspection unit that inspects the game program by executing the game program while using the medium inferred by the inference unit as a choice of the medium by the user in the game state as the game progresses.

2. A system according to claim 1, wherein, in the matrices, a kind of medium among the plurality of media provided in the game and the distinction between the game field and the owned medium set constitutes rows and the other constitutes columns, and wherein the tensor-data creating unit stores information regarding the presence or absence of the medium in each element of the matrices.

3. A system according to claim 1, wherein the tensor-data creating unit creates new tensor data by creating the array data on the basis of a game log newly obtained by the game-log obtaining unit.

4. A system according to claim 1, wherein the game log includes information for identifying the user, and wherein the tensor-data creating unit creates tensor data by storing the array data on a per-user basis along a user axis representing a kind of user.

5. A system according to claim 1, wherein the game is a battle game in which a plurality of users play a battle by selecting media from the individual owned medium sets thereof and placing the media on the game field, and wherein the tensor-data creating unit creates tensor data by storing the array data along a number-of-times-of-appending axis representing the number of times of appending.

6. A system according to claim 1, wherein a plurality of kinds of media provided in the game vary depending on a class selected by the user, wherein the game log includes information for identifying the class, and wherein the tensor-data creating unit creates tensor data by storing the array data on a per-class basis along a class axis representing a kind of class.

7. A system according to claim 1, wherein when a new kind of medium is added to the game, the inference unit infers the medium to be selected by the user in the given game state by further using a transformation matrix representing the relationship between the medium being added and the media provided in the game.

8. A system according to claim 1, wherein the learning model is a neural network model.

9. A system according to claim 1, wherein the inference unit compares the likelihoods of the media to be selected by the user with a predetermined threshold and outputs the medium having the highest likelihood, and wherein the inspection unit inspects the game program by executing the game program while using the medium output by the inference unit as a choice of the medium by the user.

10. A system according to claim 9, wherein the inspection unit inspects the game program by executing the game program while using the media output by the inference unit as choices of the medium by the user in order from the medium having the highest likelihood.

11. A system according to claim 1, wherein the inspection unit inspects the game program by executing the game program in a headless mode.

12. A system according to claim 1, wherein the owned medium set is constituted of a first medium set that can be selected by the user and a second medium set that cannot be selected by the user, the first and second medium sets being determined in accordance with the progress of the game, and wherein the inference unit infers, from the first medium set, the medium to be selected by the user in the given game state by using the learning model.

13. A method for inspecting a game program for a game that progresses as a user selects a medium from an owned medium set configured to include a plurality of media and places the medium on a game field, the method comprising:

a step of obtaining a game log from a game server that stores the game log, the game log being created in accordance with a user operation and including medium information regarding the media, the medium information being included in a game state configured to include the game field and the owned medium set;

a step of creating tensor data by creating array data in which matrices representing the media information included in the game state are arrayed along a time axis on the basis of the obtained game log;

a step of generating a learning model by performing machine learning while using the created tensor data as learning data;

a step of inferring the medium to be selected by the user in a given game state by using the learning model; and a step of inspecting the game program by executing the game program while using the medium inferred as a choice of the medium by the user in the game state as the game progresses.

14. A non-transitory computer readable medium storing a program for causing a computer to execute the steps of the method according to claim 13.

15. A machine-learning assisting device that creates learning data for generating a learning model through machine learning, the learning model serving to infer a medium to be selected by a user in a game that progresses as the user selects a medium from an owned medium set configured to include a plurality of media and places the medium on a game field, the machine-learning assisting device comprising:

a game-log obtaining unit that obtains a game log from a game server that stores the game log, the game log being created in accordance with a user operation and including medium information regarding the media, the medium information being included in a game state configured to include the game field and the owned medium set; and a tensor-data creating unit that creates tensor data by creating array data in which matrices representing the media information included in the game state are arrayed along a time axis on the basis of the obtained game log.

\* \* \* \* \*